Figure 1:
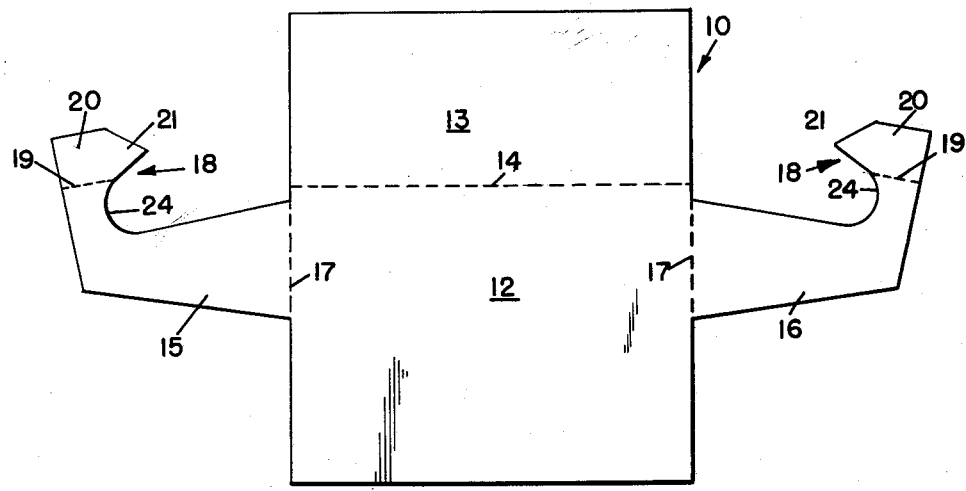

March 24, 1964     G. M. TALLENT     3,125,969

DISPOSABLE FOLDABLE BLANK TRAY FOR VEHICLE WINDOWS

Filed Oct. 22, 1962     2 Sheets-Sheet 1

INVENTOR.
GARLAND M. TALLENT
BY
Felix A. Russell

March 24, 1964     G. M. TALLENT     3,125,969
DISPOSABLE FOLDABLE BLANK TRAY FOR VEHICLE WINDOWS
Filed Oct. 22, 1962     2 Sheets-Sheet 2
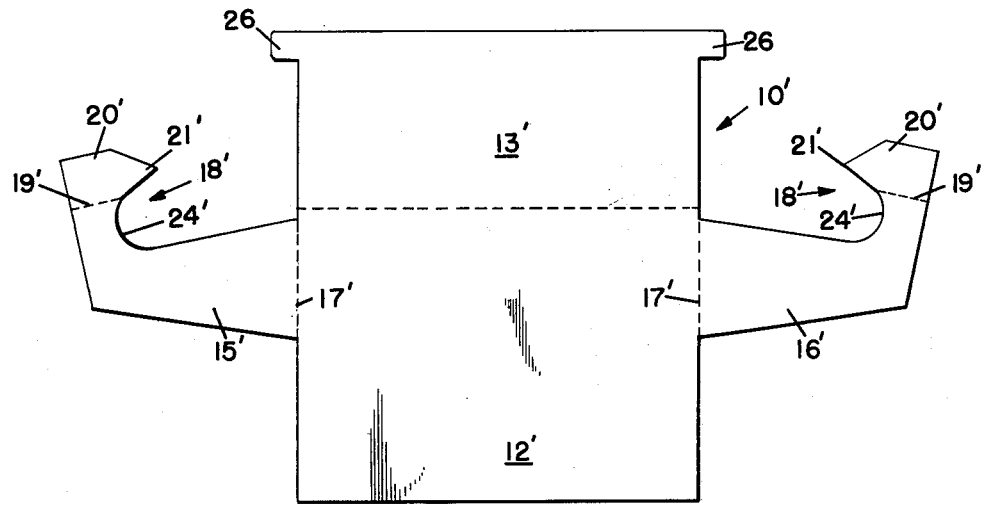
Fig. 5
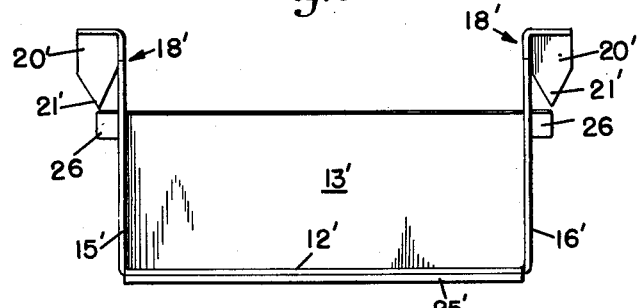
Fig. 6
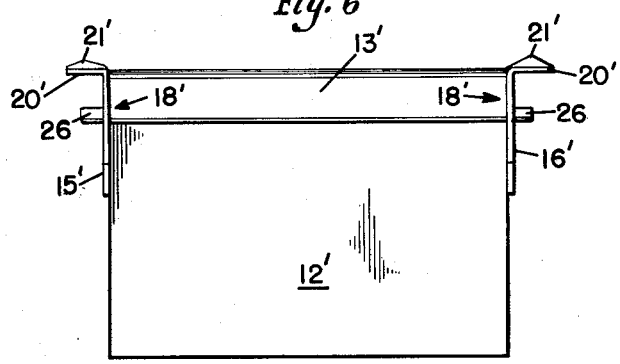
Fig. 7
INVENTOR.
GARLAND M. TALLENT
BY 

United States Patent Office 3,125,969
Patented Mar. 24, 1964

3,125,969
DISPOSABLE FOLDABLE BLANK TRAY FOR
VEHICLE WINDOWS
Garland M. Tallent, 100 Padgett St., Corbin, Ky.
Filed Oct. 22, 1962, Ser. No. 232,035
2 Claims. (Cl. 108—46)

This invention relates to a disposable foldable-blank tray for vehicle windows and it consists in the combinations, constructions and arrangements herein described and claimed.

Generally there is provided a die-cut and scored blank of paperboard or equivalent sheet material having a relatively large rectangular base panel providing a rimless tray or shelf intended primarily as a holder for food and beverage containers served in drive-in restaurants. The rear edge of the tray panel desirably has an upwardly foldable smaller back splasher panel integrally joined thereto along a scored hinge line. A pair of upwardly bendable supporting arms is integrally connected along scored fold lines to the rear portions of the side edges of the tray panel. The supporting arms have rearwardly and downwardly extending hook portions adapted to hook over the rounded window sill of an automobile or the like. A vertically disposed score line close to the rear edge of each hook portion permits bending the hook tips into a plane approaching parallelism to the automobile window so that the hook tips can be inserted down between the pane and the adjacent sill edge for secure retention therebetween.

The tray panel is desirably but optionally stiffened by laminating preferably against its surface one or more plies of paper or other sheet material. Also optionally the upper side edges of the back splasher panel may be provided with positioning ears extendable through the hooks of the supporting arms to prevent tipping forward of the rear panel. However, this result can also be obtained without the use of said ears by convergingly angling the upper ends of the support arms.

It is accordingly an object of the invention to provide a disposable tray for vehicle window mounting.

It is another object of the invention to provide a device of the character described which is economically formed from a single foldable blank of paperboard or equivalent sheet material.

It is a further object of the invention to provide such a device having integral folding hook-like arms the ends of which are bendable to lie against a vehicle window pane and to securely extend down between said pane and its adjacent window sill.

It is yet another object of this invention to provide such a tray having an integral back-splasher panel to protect the vehicle upholstery against soilage.

It is still a further object of the invention to provide a device of the character set forth in which the tray panel proper is reinforced by one or more stiffening plies laminated therewith.

Figure 2:
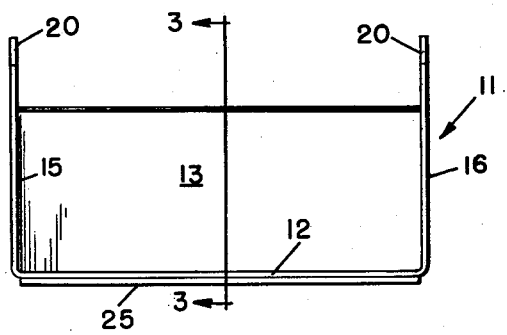
Figure 3:
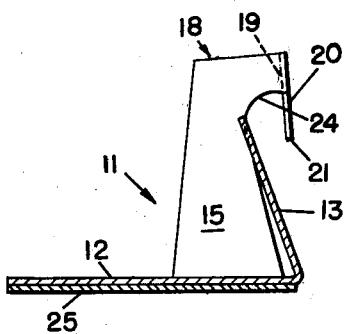
Figure 4:
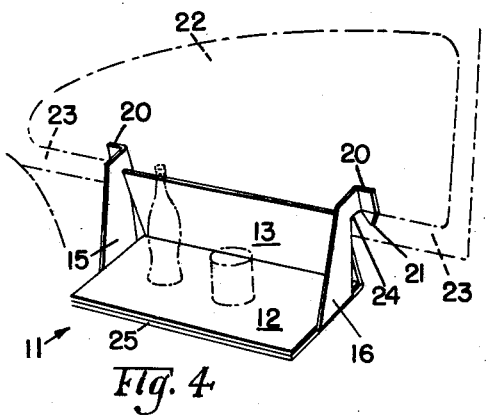

Other and further objects of the invention will become apparent from a reading of the following specification taken in conjunction with the drawings, in which:

FIGURE 1 is a plan view of a preferred form of tray blank,

FIGURE 2 is a front elevational view of a tray formed from the blank of FIGURE 1, FIGURE 3 is a side elevational view of the tray of FIGURE 2 in section taken on line 3—3 of FIGURE 2, FIGURE 4 is a perspective view of the tray of FIGURES 2 and 3 showing a typical use thereof, FIGURE 5 is a plan view of a modified form of tray blank, FIGURE 6 is a front elevational view of a tray formed from the blank of FIGURE 5, and FIGURE 7 is a plan view of the tray of FIGURE 6.

With reference now to FIGURES 1 through 4 of the drawings, the numerals 10 and 11 generally designate, respectively, a foldable blank and a tray formed therefrom. The blank 10 may be die cut, and simultaneously scored, from paperboard, cardboard or other suitable sheet material. The blank has a large rectangular tray or shelf panel 12 and a smaller rectangular back splasher panel 13 integrally joined thereto along a scored fold or hinge line 14.

The panel 12 also has two hook-shaped integral support arms 15 and 16 integrally connected to the rear portions of its side edges along a pair of scored hinge lines 17.

The support arms 15 and 16 have hook-shaped extensions 18 vertically and medially scored along hinge lines 19 to define a pair of ears 20 foldable to lie in a common vertically disposed plane (FIGS. 3 and 4) so that their pointed ends 21 can be easily pushed down between a vehicle window pane 22 and its adjacent window sill 23, to secure the tray 11 in the use position thereof disclosed in FIGURE 4. In this position the bight portions 24 of the hook extensions 18 supportingly embrace the top surface of the window sill 23.

The tray or shelf panel 12 desirably has stiffening panel 25 of approximately the same size cemented or otherwise fastened thereto, preferably to its bottom surface. The stiffening panel 25 may consist of a single ply of sheet material or may have several plies adhesively laminated to each other and to the tray panel 12. At least the upper surface of the panel 12 may be treated with waterproofing material.

The upper edge of the back splasher panel 15 (FIG. 3) preferably lies at least sufficiently below the bight portion 24 of the hook extensions 18 to permit the arms 15 and 16 to be inwardly converged so that their rear edges can engage the face of the panel 13 to prevent its being inadvertently swung forwardly. However, the hinge 14 is sufficiently stiff to prevent such swinging under normal use conditions.

In the species of FIGURES 5, 6 and 7, the basic blank and tray members and elements are substantially identical with those of FIGURES 1 through 4. Therefore, to avoid unnecessary repetition of description, comparable parts in FIGURES 5, 6 and 7 are designated by primed numerals corresponding to the unprimed numerals indicating their counterparts in the first described species.

In the modification of FIGURES 5, 6 and 7, the back splasher 13' has a pair of laterally extending integral fingers 26 which engage behind the rear edges of the supporting arms 15' and 16' to prevent inadvertent forward swinging of the back splasher panel 13'.

While but two forms of the invention have been shown and described herein, it will be readily apparent to those skilled in the art that many minor modifications may be made without departing from the spirit of the invention or the scope of the appended claims.

What is claimed is:

1. A tray for mounting adjacent a vehicle window or the like, comprising: a tray panel, a back splasher panel integrally connected to the rear edge of said tray panel along a fold line, a flat support arm integrally connected at each side of said tray panel along a fold line, said support arms each having hook-like ends adapted to engage over the sill of a vehicle window or like structure, an ear integrally connected to each hook-like end along a fold line, said ears being bendable through approximately 90° into a common vertically disposed plane and having downwardly extending tips adapted to extend between a window pane and an adjacent window sill to fasten said tray to and depending from said window sill, and means for preventing undesired forward swinging of said back splasher panel, said means comprising the provision of sufficient width to said back splasher panel to extend the same behind said support arms.

2. A tray for mounting adjacent a vehicle window or the like, comprising: a tray panel, a back splasher panel integrally connected to the rear edge of said tray panel along a fold line, a flat support arm integrally connected at each side of said tray panel along a fold line, said support arms each having hook-like ends adapted to engage over the sill of a vehicle window or like structure, an ear integrally connected to each hook-like end along a fold line, said ears being bendable through approximately 90° into a common vertically disposed plane and having downwardly extending tips adapted to extend between a window pane and an adjacent window sill to fasten said tray to and depending from said window sill, and means for preventing undesired forward swinging of said back splasher panel, said means comprising a finger-like extension formed integrally with each side of said back splasher panel, said extensions each being engageable behind the rear edge of an adjacent support arm.

References Cited in the file of this patent
UNITED STATES PATENTS

| | | |
|---|---|---|
| 1,446,231 | West | Feb. 20, 1923 |
| 2,459,443 | Mabry | Jan. 18, 1949 |
| 2,564,259 | Huglund | Aug. 14, 1951 |
| 2,584,849 | Decker | Feb. 5, 1952 |
| 2,695,712 | Kolander | Nov. 30, 1954 |
| 2,770,411 | McKay | Nov. 13, 1956 |
| 2,770,513 | Brown | Nov. 13, 1956 |
| 3,048,458 | Thomas | Aug. 7, 1962 |